US008297098B2

(12) United States Patent
Marshall et al.

(10) Patent No.: US 8,297,098 B2
(45) Date of Patent: Oct. 30, 2012

(54) DUAL RAM ASSEMBLY FOR NECKER MACHINE

(75) Inventors: Harold James Marshall, Forest, VA (US); Dennis Shuey, Forest, VA (US)

(73) Assignee: Belvac Production Machinery, Inc., Lynchburg, VA (US)

( * ) Notice: Subject to any disclaimer, the term of this patent is extended or adjusted under 35 U.S.C. 154(b) by 493 days.

(21) Appl. No.: 12/501,135

(22) Filed: Jul. 10, 2009

(65) Prior Publication Data

US 2010/0212390 A1    Aug. 26, 2010

Related U.S. Application Data

(60) Provisional application No. 61/202,427, filed on Feb. 26, 2009.

(51) Int. Cl.
*B21D 51/26* (2006.01)
*B21J 11/00* (2006.01)

(52) U.S. Cl. .......................................... 72/94; 72/405.03

(58) Field of Classification Search ............... 72/405.03, 72/452.1, 452.4, 104, 94, 379.4; 74/56, 57, 74/569; 198/459.2, 459.8, 478.1
See application file for complete search history.

(56) References Cited

U.S. PATENT DOCUMENTS

| | | | |
|---|---|---|---|
| 1,673,236 A | 6/1928 | Fleisher | |
| 3,418,837 A | 12/1968 | Vanderlaan et al. | |
| 3,581,542 A * | 6/1971 | Wahler et al. | 72/94 |
| 3,797,429 A | 3/1974 | Wolfe | |
| 3,983,729 A | 10/1976 | Traczyk et al. | |
| 4,278,711 A | 7/1981 | Sullivan | |
| 4,402,202 A | 9/1983 | Gombas | |
| 4,446,714 A | 5/1984 | Cvacho | |
| 4,513,595 A | 4/1985 | Cvacho | |
| 4,519,232 A | 5/1985 | Traczyk et al. | |
| 4,671,093 A | 6/1987 | Dominico et al. | |
| 4,808,053 A | 2/1989 | Nagai et al. | |
| 5,209,101 A | 5/1993 | Finzer | |
| 5,220,993 A | 6/1993 | Scarpa et al. | |

(Continued)

FOREIGN PATENT DOCUMENTS

DE    37 05 878 A1    9/1987

(Continued)

OTHER PUBLICATIONS

PCT International Search Report and the Written Opinion on application No. PCT/US2010/025182 dated Sep. 28, 2010; 17 pages.

(Continued)

*Primary Examiner* — Dana Ross
*Assistant Examiner* — Mohammad I Yusuf
(74) *Attorney, Agent, or Firm* — Nixon Peabody LLP (57) ABSTRACT

A dual ram assembly for a turret machine includes a first and second ram. The first ram comprises a first cam follower bracket and a first set of cam followers. An outer die tooling is connected to the first ram. The second ram comprises a second cam follower bracket and second set of cam followers. An inner knockout tooling is connected to the second ram. The first set of cam followers is configured to follow a first cam surface. The second set of cam followers is configured to follow a second cam surface. The first ram is connected to the second ram on a slide block. As the first and second sets of cam followers follow the first and second cam surfaces, the inner knockout tooling and the outer die tooling move toward or away from an article to be worked on.

23 Claims, 13 Drawing Sheets

U.S. PATENT DOCUMENTS

| | | | |
|---|---|---|---|
| 5,242,497 | A | 9/1993 | Miller et al. |
| 5,249,449 | A | 10/1993 | Lee et al. |
| 5,611,231 | A | 3/1997 | Marritt et al. |
| 5,676,006 | A * | 10/1997 | Marshall ............ 72/94 |
| 5,755,130 | A | 5/1998 | Tung et al. |
| 5,832,769 | A | 11/1998 | Schultz |
| 6,220,138 | B1 | 4/2001 | Sakamoto |
| 6,637,247 | B2 | 10/2003 | Bowlin |
| 7,263,867 | B2 * | 9/2007 | Bartosch et al. ........ 72/94 |
| 7,310,983 | B2 | 12/2007 | Schill et al. |
| 7,387,007 | B2 | 6/2008 | Schill et al. |
| 7,404,309 | B2 | 7/2008 | Schill et al. |
| 7,409,845 | B2 | 8/2008 | Schill et al. |
| 7,418,852 | B2 | 9/2008 | Schill et al. |
| 7,464,573 | B2 | 12/2008 | Shortridge |
| 7,530,445 | B2 | 5/2009 | Marshall et al. |
| 2006/0101889 | A1 * | 5/2006 | Schill et al. ............ 72/356 |
| 2007/0227859 | A1 | 10/2007 | Marshall et al. |
| 2010/0212130 | A1 | 8/2010 | Marshall |
| 2010/0212385 | A1 | 8/2010 | Marshall |
| 2010/0212394 | A1 | 8/2010 | Babbitt et al. |
| 2010/0213030 | A1 | 8/2010 | Green |
| 2010/0213677 | A1 | 8/2010 | Marshall |

FOREIGN PATENT DOCUMENTS

| | | |
|---|---|---|
| DE | 39 08 394 C1 | 12/1989 |
| DE | 40 23 771 | 1/1992 |
| DE | 40 23 771 A1 | 1/1992 |
| DE | 103 19 302 B3 | 8/2004 |
| EP | 0 384 427 A1 | 8/1990 |
| EP | 1 215 430 A1 | 6/2002 |
| EP | 1 714 939 A1 | 10/2006 |
| GB | 0 235 28 | 0/1910 |
| GB | 1 042 506 | 9/1966 |
| JP | 05-038476 A | 2/1993 |
| JP | 2002-310178 | 10/2002 |
| WO | WO-88/05700 A1 | 8/1988 |
| WO | WO-90/11839 | 10/1990 |
| WO | WO-96/33032 | 10/1996 |
| WO | WO-97/37786 | 10/1997 |
| WO | WO-98/19807 A1 | 5/1998 |
| WO | WO-01/90591 A1 | 11/2001 |
| WO | WO-2006/055185 A1 | 5/2006 |
| WO | WO-2010/099067 A1 | 9/2010 |
| WO | WO-2010/099069 A1 | 9/2010 |
| WO | WO-2010/099081 A1 | 9/2010 |
| WO | WO-2010/099082 A1 | 9/2010 |
| WO | WO-2010/099165 A2 | 9/2010 |
| WO | WO-2010/099171 A1 | 9/2010 |

OTHER PUBLICATIONS

U.S. Appl. No. 11/581,787, filed Oct. 17, 2006, Marshall.
U.S. Appl. No. 11/692,564, filed Mar. 28, 2007, Marshall et al.
U.S. Appl. No. 11/692,584, filed Mar. 28, 2007, Schill et al.
International Search Report for PCT Application No. PCT/US2010/024941 dated Jun. 23, 2010.
International Search Report for PCT Application No. PCT/US2010/024988 dated Jun. 14, 2010.
International Search Report for PCT Application No. PCT/US2010/024992 dated Jun. 2, 2010.
International Search Report for PCT Application No. PCT/US2010/025192 dated Jun. 18, 2010.
Partial Search Report for PCT Application No. PCT/US2010/025182 dated Jul. 14, 2010.
International Search Report for PCT Application No. PCT/US2010/024926 dated May 27, 2010.
American National Can; Drawings showing commercially available 5811-12 necker machine and Parts List; Oct. 1993; 4 pages.
American National Can; Extracts from brochure: 5811/5811-2 Necker Flanger Reformer—Periodic Inspection and Maintenance Procedures; Apr. 22, 1994; 9 pages.
American National Can; Extracts from brochure: AMC Necker Secrets Revealed; 1996; 3 pages.
American National Can; Invoice to Hanil Can Co., Ltd dated Feb. 2, 1998; 1 page.
Notice of Opposition mailed May 12, 2010, to European Application No. 05817255.2; Patent No. 1824622.

* cited by examiner

DUAL RAM ASSEMBLY FOR NECKER MACHINE

CROSS-REFERENCE TO RELATED PATENT APPLICATIONS

This application is an application claiming the benefit under 35 U.S.C. §119(e) of U.S. Provisional Patent Application No. 61/202,427 filed Feb. 26, 2009, which is incorporated by reference herein in its entirety.

BACKGROUND

The present invention relates generally to the field of machines for forming or processing an article, such as a beverage container or can. More specifically, the invention relates to push ram assemblies. More specifically, this invention relates to push ram assemblies that comprise two ram devices in a single assembly.

Ram assemblies may be used to push or move articles, such as cans. For example, ram assemblies may be used to push a can that is being processed in a curling, cutting, expanding, necking, or other forming operation machine.

Conventional ram assemblies comprise a cylindrical or round ram, which moves axially relative to the turret shaft, and a plain bushing, which is mounted fixed to the shaft. The ram can be moved by a ribbed barrel cam. Conventional assemblies in conventional turrets operate by one ram assembly pushing a can (at a closed end of the can) into a forming head on a machine, and a second, separate ram assembly pushing the forming tooling into (or onto) the can at an open end of the can.

SUMMARY

One embodiment of the invention provides a ram assembly for a turret machine. The ram assembly comprises: a first ram with a first cam follower bracket and a first set of cam followers; an outer die tooling connected to the first ram; a second ram with a second cam follower bracket and second set of cam followers; an inner knockout tooling connected to the second ram; a first cam surface; and a second cam surface. The first set of cam followers is configured to follow the first cam surface. The second set of cam followers is configured to follow the second cam surface. The first ram is connected to the second ram on a slide block. As the first set of cam followers follows the first cam surface, the outer die tooling moves toward or away from an article to be worked on. As the second set of cam followers follows the second cam surface, the inner die tooling moves toward or away from the article to be worked on.

Another embodiment of the invention provides a necking module. The necking module comprises: a necking machine; a first cam surface on a shaft of the necking machine; a second cam surface on the shaft; and a dual ram assembly including an inner knockout tooling and an outer die tooling configured to perform a necking operation on an article to be worked on. The dual ram assembly comprises: a slide block; a first ram with a first cam follower bracket and a first set of cam followers; and a second ram with a second cam follower bracket and second set of cam followers. The outer die tooling is connected to the first ram. The first set of cam followers is configured to follow the first cam surface. The inner knockout tooling is connected to the second ram. The second set of cam followers is configured to follow the second cam surface. The first ram is connected to the second ram on the slide block. As the first set of cam followers follows the first cam surface, the outer die tooling moves toward or away from an article to be worked on. As the second set of cam followers follows the second cam surface, the inner die tooling moves toward or away from the article to be worked on.

Yet another embodiment provides a method for a utilizing a dual ram assembly in a necking machine. The method comprises the steps of: providing a first necking station with a first dual ram assembly including first and second rams attached to one another; moving the second ram with inner knockout tooling towards an article to be worked on in the first necking station; moving the first ram with outer die tooling towards the article to be worked on; performing a necking operation on the article to be worked on; and withdrawing the outer die tooling and inner knockout tooling from the article to be worked on.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

According to an aspect of the invention, a dual ram assembly is provided that includes an inner knockout tool and an outer die tool. Each dual ram assembly comprises two rams, each ram including a set of cam followers that follow a cam surface which pushes a connecting tooling (inner or outer) toward or away from an article to be worked on. The inner and outer tooling can be configured to perform a necking operation on the article to be worked on, or any other suitable type of working operation (such as, but not limited to, flanging, reforming, trimming, curling, expanding, threading, inspection, etc.).

Machines may be used to form, process or otherwise perform a working action on an article. In a machine line, an article is first fed into a first machine to fill pockets in a turret star wheel. Each star wheel may have any number of pockets to hold articles for processing or transfer. For example, a turret star wheel may have six, eight, ten, or more stations to hold six, eight, ten, or more articles, respectively. The articles are then passed to a transfer star wheel adjacent the turret. Each transfer star wheel has any number of pockets to hold articles for processing or transfer. For example, the transfer star wheel may have twenty pockets, or any other suitable amount. It will be recognized that the star wheel is capable of having one station up to any suitable number of stations. The transfer star wheel may have the same amount of pockets as the turret star wheels. Alternatively, the transfer star wheels may have more pockets then the turret star wheels. The articles, in an embodiment, remain stationary in an axial direction while the dual ram assembly moves toward and away from the article to perform the working operation.

The article is then passed from the turret star wheel to a transfer star wheel, which transfers the article to another machine in the machine line that will perform another stage of the working operation on the article. When all process/necking stages are complete, the article is discharged from the machine line. The machine line may be a recirculated machine line, a linear line, or any other type of machine line.

For exemplary purposes only, the below description will describe the mechanisms and methods for use on a can. It will be recognized that any other type of article (such as that described above) may be used.

Embodiments of the invention relate to mechanisms to use in can making machinery. More specifically, can die necking machines. In the can necking process, the open end of the can is reduced in diameter. In most cases, a plurality of reductions are required for the can necking process. Sliding dual ram assemblies are used to guide and control the interaction of the forming tooling and the article (can). The can is pressurized with air to strengthen the body of the can and resist the forces of necking in order to stabilize and hold the can in the proper position during the forming process.

Embodiments of the invention will now described with reference to the figures.

Figure 12:
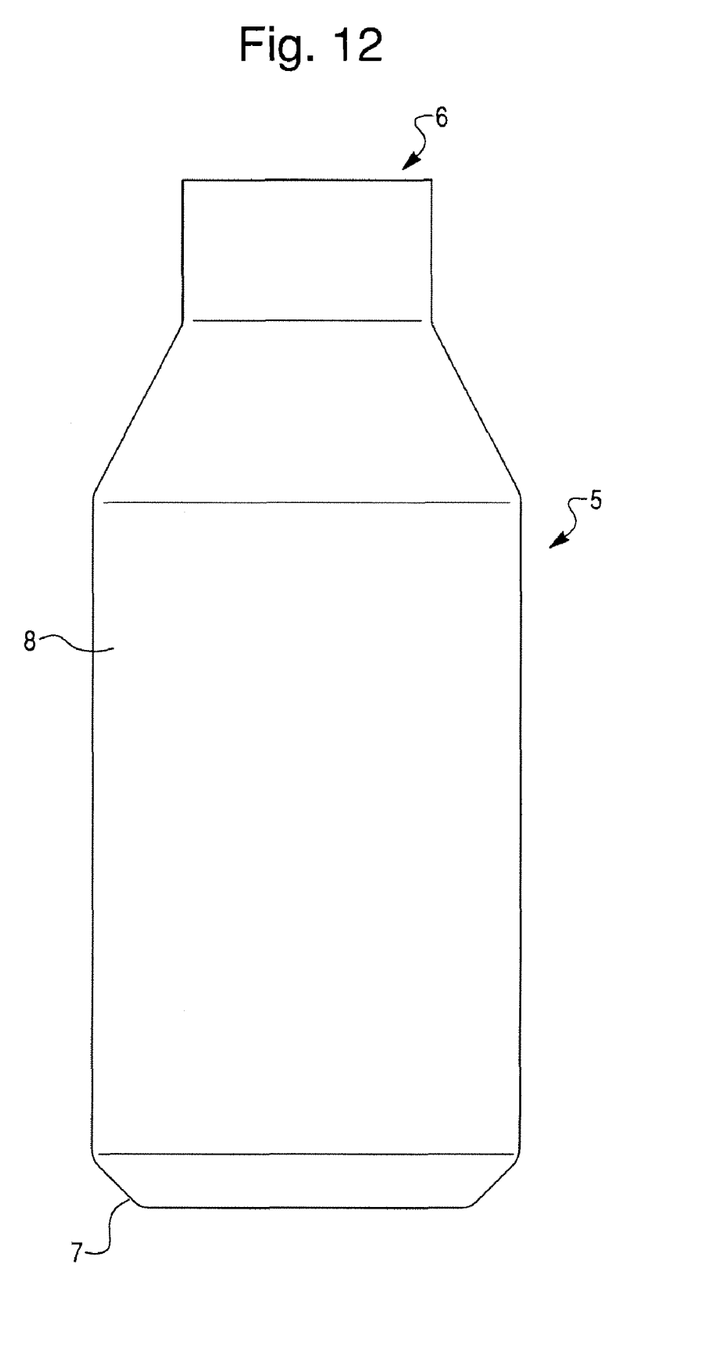
FIG. 12 is a schematic view of a can prior to a necking operation according to an embodiment of the invention.

FIGS. 1-9 illustrate a dual ram assembly 100 for performing a necking operation on an article 5 through a machine line 10. An article 5 may be a can, any suitable food or beverage container, jar, bottle or any other suitable article. The article 5 has an open end 6, opposite a closed end 7, and a sidewall 8 extending from the closed end 7, such as shown in FIG. 12. Alternatively, the article 5 may be open at both ends, or the article 5 may comprise any other desired configuration. A top, lid or other closure can be added to the article 5 after completion of the appropriate working operations.

For exemplary purposes only, the below description will describe the dual ram assembly 100, which may be used in a machine (such as a necking machine) module 20, or a machine line 10 for use in processing a can 5. It will be recognized that any other type of article 5 (such as that described above) may be used. Alternatively, a dual ram assembly 100 may be utilized on a machine that does not operate on cans 5, but may be used on machines that work on any other suitable machine or assembly line.

Figure 1:
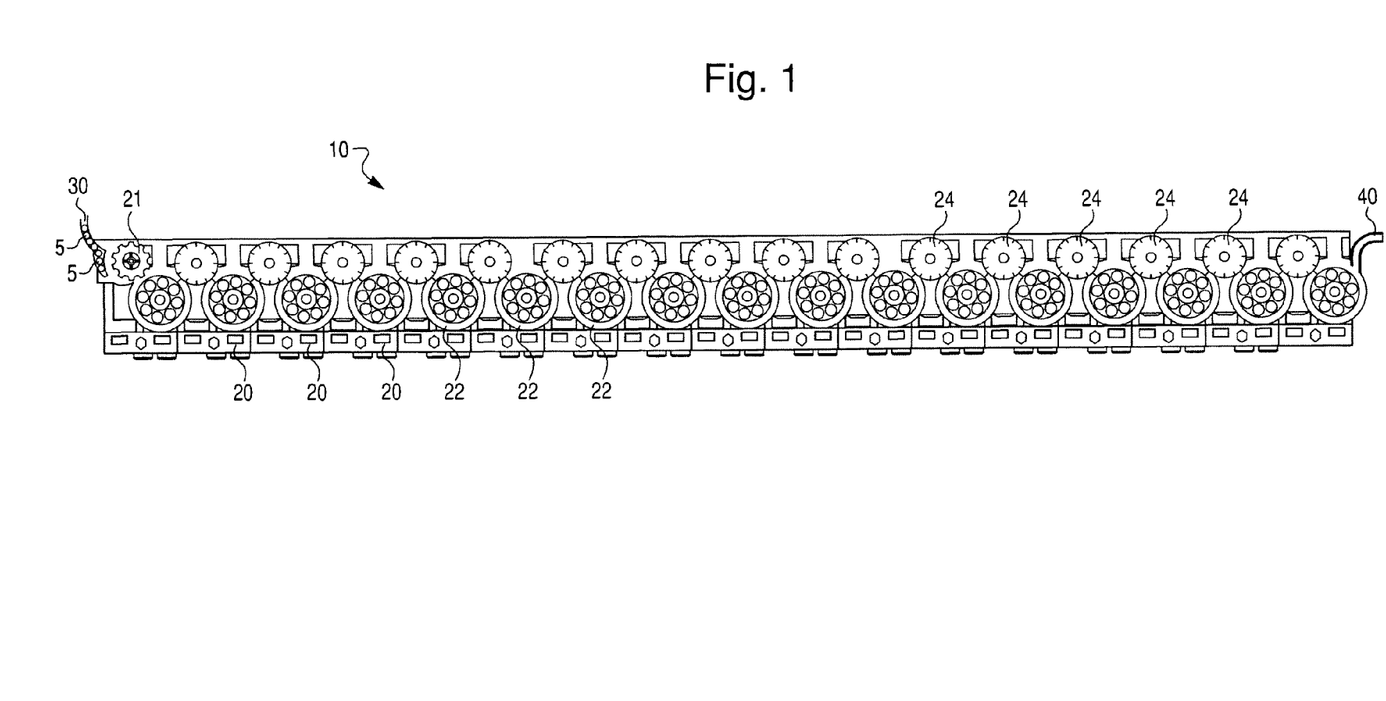
FIG. 1 illustrates a machine line for a machine arrangement according to an embodiment.

FIG. 1 illustrates a machine line 10 in which cans 5, according to an embodiment, are fed into a continuously rotating infeed transfer star wheel 21 from an infeed 30. The cans 5 are passed from infeed star wheel 21 to pockets 22A in the transfer star wheel 22 in a module 20 of the machine line, best shown in FIG. 2. The cans 5 are continuously rotated throughout the machine line 10 as the cans 5 pass from one module 20 to the next module 20. From the transfer star wheel 22, the cans 5 are passed to pockets 24A in a turret star wheel 24 on a turret 50. In the pockets 24A of the turret star wheel 24, the can 5 undergoes a working operation (necking operation) by the tooling 105 (see FIG. 6B) on the appropriate dual ram assembly 100 that corresponds to the pocket 24A on the turret star wheel 24. After completion of the necking operation in a first stage on the first module 20, the can 5 is passed to an adjoining transfer star wheel 22 and the process is repeated throughout the machine line 10. At the end of the machine line 10, the can 5 may exit the machine line 5 via a discharge (or exit) track 40.

While the invention is not so limited, embodiments of the invention may comprise forming machines 50, with one or more dual ram assemblies 100, constructed as modules 20. The use of modules 20 allows for the machine line 10 to be assembled and changed to provide as many forming stages as is required and to allow for adding additional stages such as flanging, necking, trimming, curling, threading, and/or base reforming/reprofiling stages, which may added and/or removed as desired.

Figure 2:
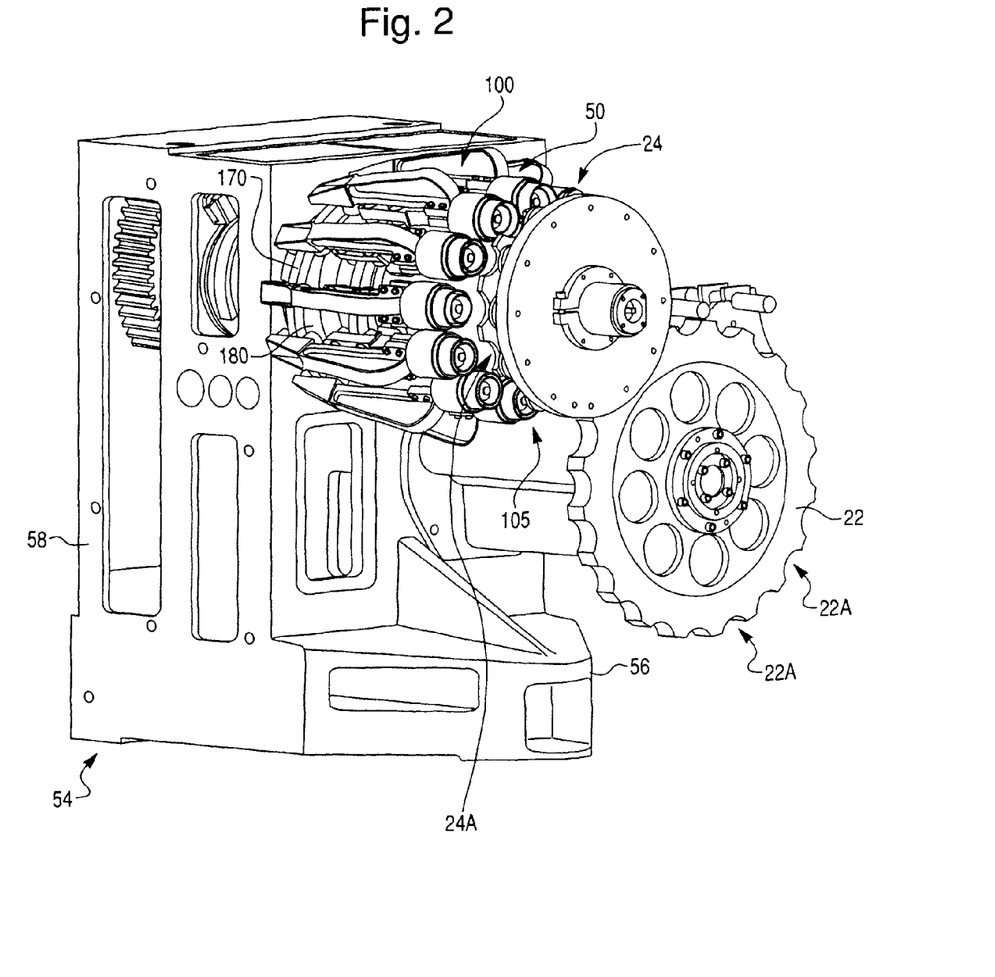
FIG. 2 is a perspective view of a module with a turret machine and transfer star wheel according to an embodiment.
Figure 3:
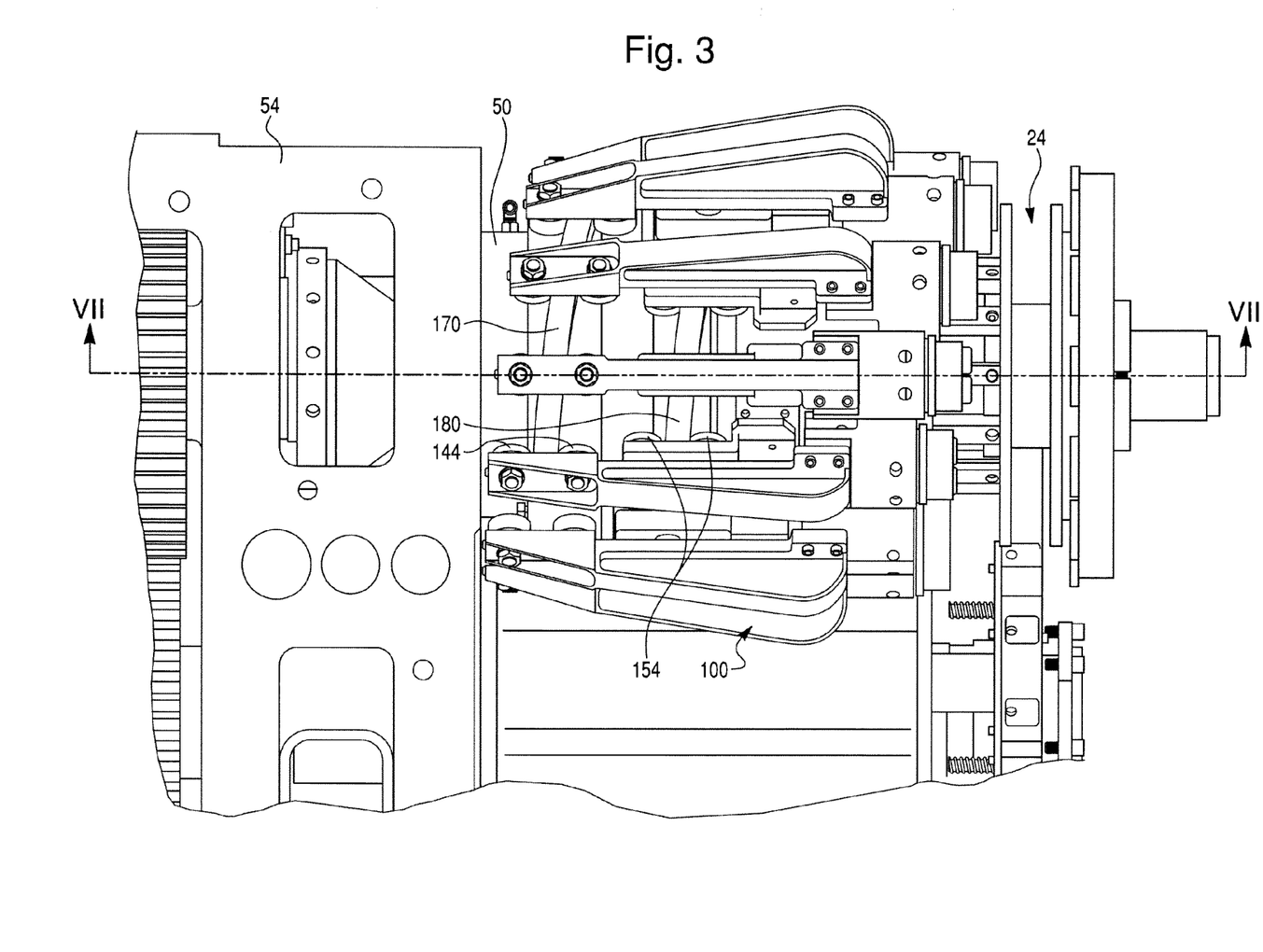
FIG. 3 is a detail view of a dual ram assembly on a modular turret machine according to an embodiment.

As can be seen in FIGS. 2 and 3, the module 20 includes a base 54 with a foot portion 56 and a leg portion 58. The turret machine 50 is positioned on the base 54. The module 20 also includes a corresponding transfer star wheel 22. The dual ram assemblies 100 are positioned around the circumferential surface of the turret 50.

The dual ram assembly 100, as shown in FIGS. 4-8, includes first and second rams 140, 150 and tooling 105. The first ram 140 includes a first bracket 142 connected to (directly or indirectly) and extending from a frame member 110 attached to a slide block 130. The first bracket 142 is attached to the frame member 100 via fasteners 151. A first set of cam followers 144 is attached to the first bracket 142 by fasteners 146. The fasteners 151, 146 may comprise bolts, screws, or any other suitable type of fastener. The first set of cam followers 144 are rollers configured to follow a first cam surface 170 (FIG. 2) on the turret 50.

Figure 4:
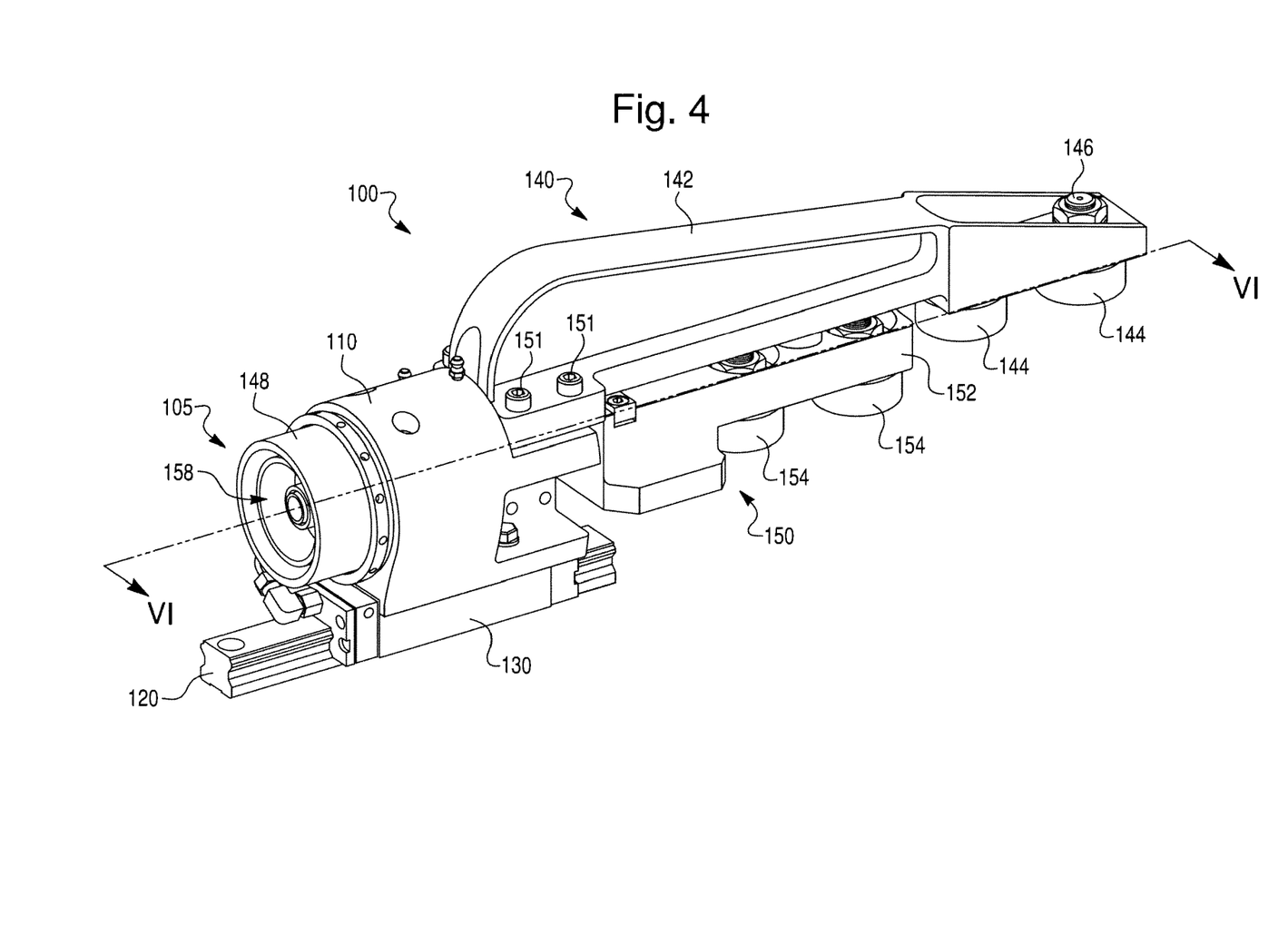
FIG. 4 is a perspective view of a dual ram assembly.
Figure 5:
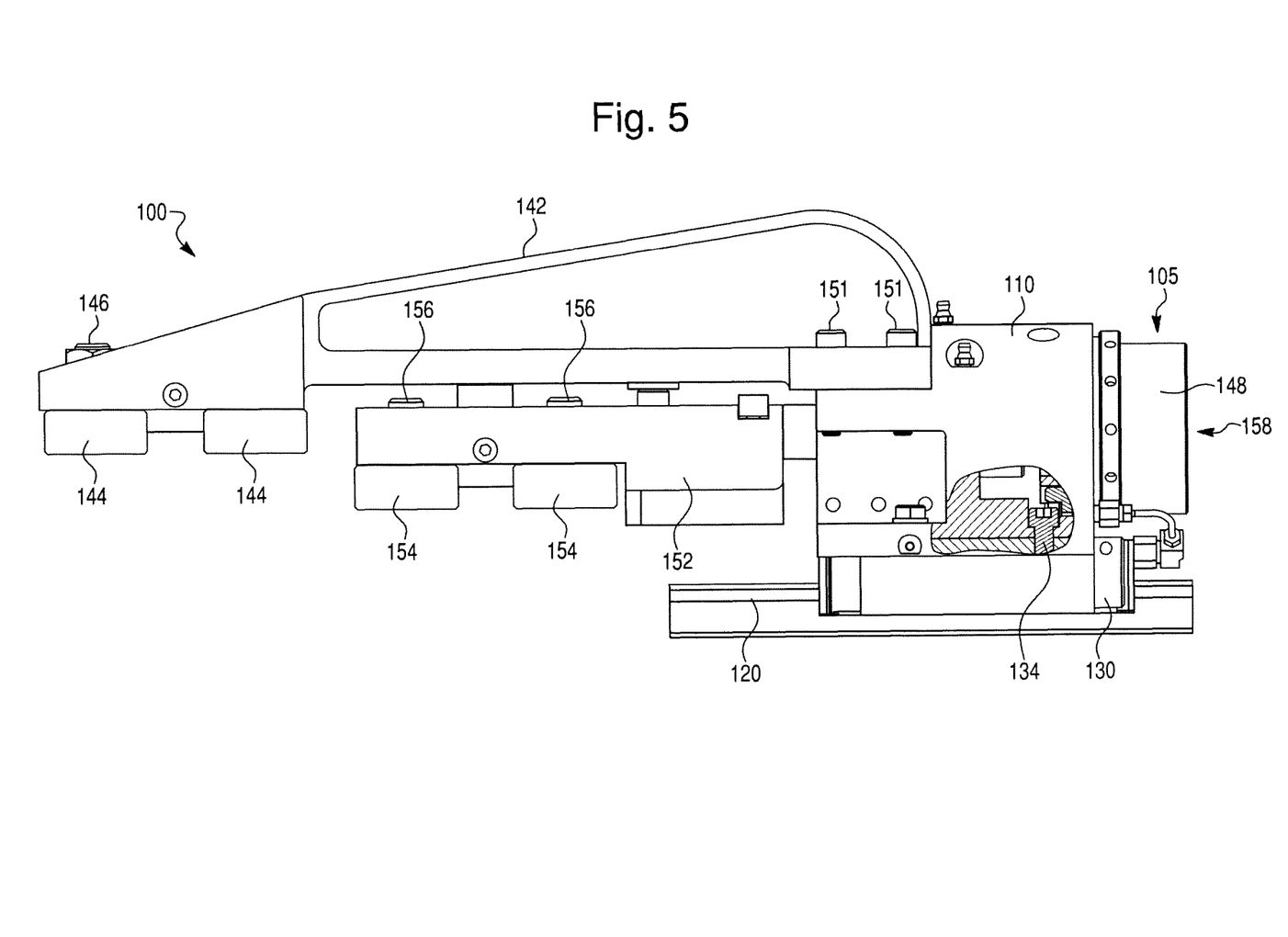
FIG. 5 is a side view of the dual ram assembly of FIG. 4.

The ram 150 includes a second bracket 152 connected to (directly or indirectly) and extending from the frame member 110 (see FIGS. 4 and 5). The second bracket 152 is connected to the frame member 110 by any suitable type of fastener (not shown). A second set of cam followers 154 is attached to the second bracket 152 by fasteners 156. The second set of cam followers 154 are rollers configured to follow a second cam surface 180 (FIG. 2) on the turret 50.

Figure 6A:
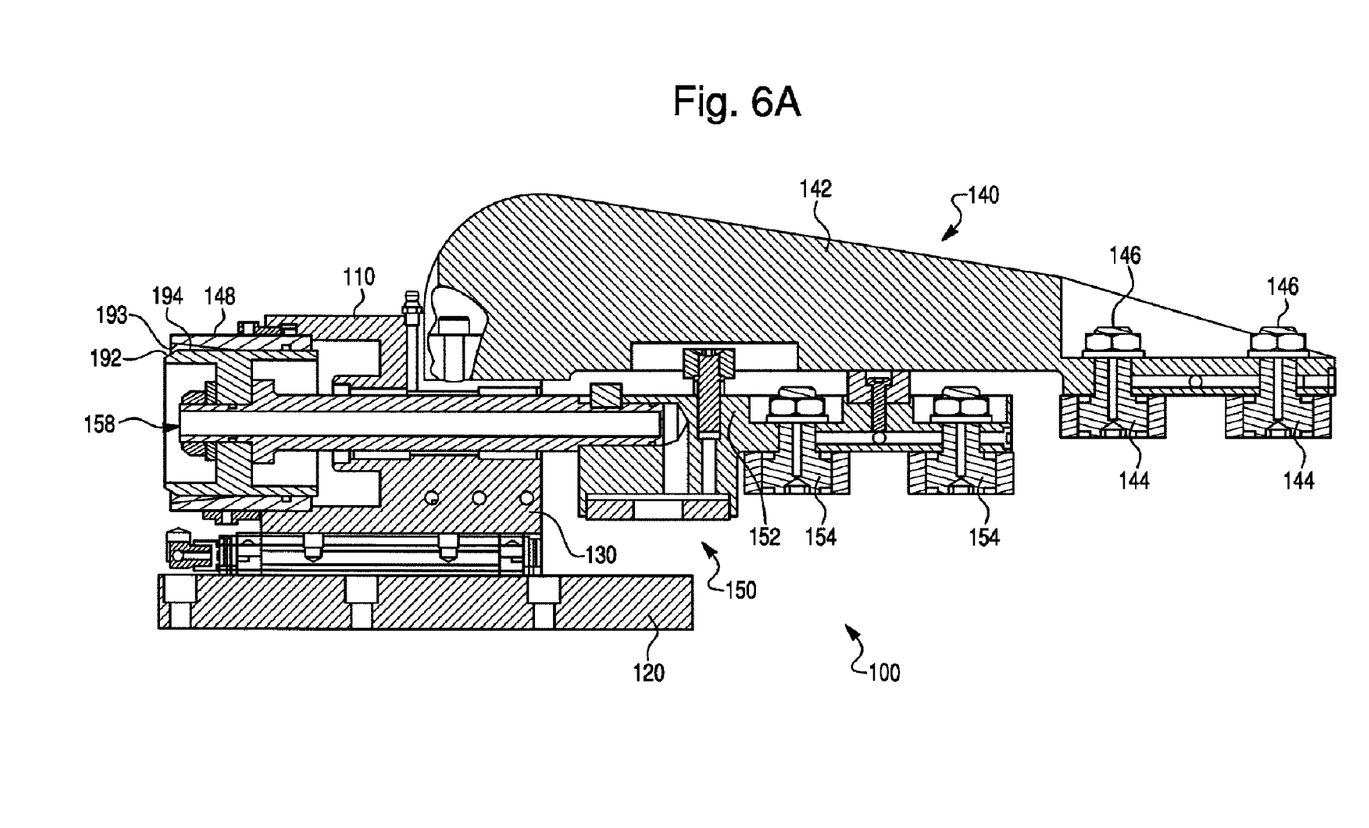
FIG. 6A is a cross-sectional view of the dual ram assembly taken along line 6-6 of FIG. 4.
Figure 6B:
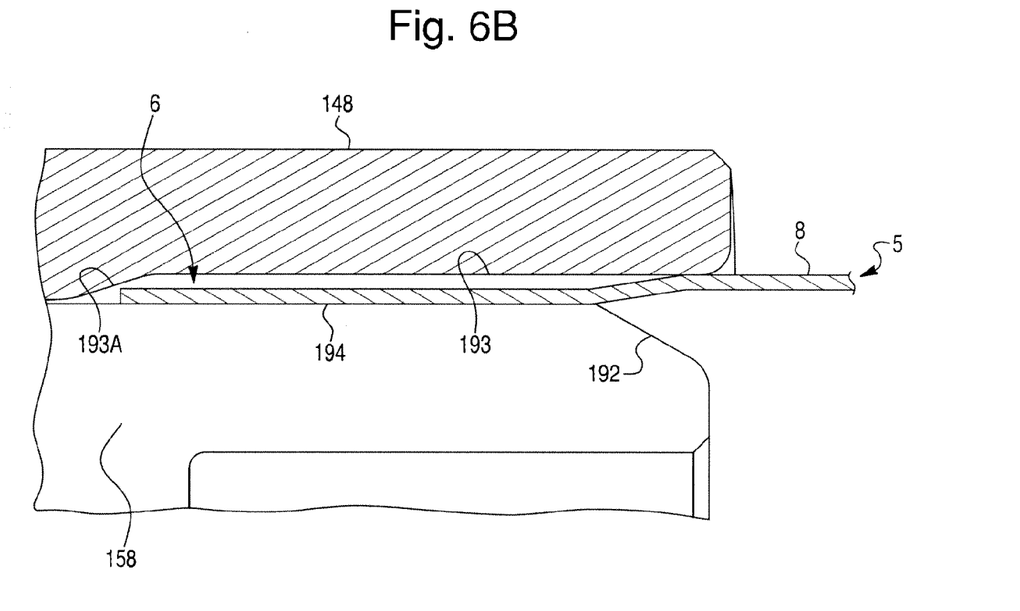
FIG. 6B is a cross-sectional view of the dual ram assembly taken along line VI-VI in FIG. 4 in which a can is shown inserted into inner and outer tooling.

The frame member 110 houses the tooling 105 for the dual ram assembly 100. The first ram 140 includes an outer die tooling 148. The second ram 150 includes an inner knockout tooling 158. As the sets of cam followers 144, 154 follow their respective cam surfaces 170, 180, the brackets 142, 152 slide toward or away from a can 5 to be worked on in a corresponding pocket 24A in the turret star wheel 24. As the second bracket 152 is moved (pushed) toward the can 5, the inner knockout tooling 158 is extended toward the can 5 (FIGS. 6A, 6B). Simultaneously, the first bracket 142 is moved (pushed) toward the can 5, thus pushing the outer die tooling 148 toward the can 5. When the outer and inner tooling 148, 158 reach the can 5, the tooling 148, 158 performs a necking operation on the can 5, and then withdraws as the cam followers 144, 155 continue following the path of their respective cam surface 170, 180.

The frame member 110 and slide block 130 slide (move) along a profiled rail 120 as the cam followers 144, 154 follow the path of their respective cam surfaces 170, 180. The frame member 110 is attached to the slide block 130 by a suitable fastener. For example, FIG. 5 illustrates a bolt 134 used to secure the frame member 110 to the slide block 130.

The slide block 130 slides over the profiled rail 120. FIGS. 4 and 5 illustrate a lubricant tubing 132 that provides lubricant from a fitting 133 in the frame member 10 to the slide block 130. The lubricant assists the slide block 130 in sliding along the profiled rail 120. The dual ram assembly 100 is rigid because rolling elements (not shown) between the slide block 130 and profiled rail 120 allow the dual ram assembly 100 to be built with zero clearance or a slight preload, which eliminates any instability in the ram; thus creating a more rigid dual ram assembly 100. The rolling elements may be preloaded ball bearings. The bearings may be auto-lubricated by any suitable mechanism.

The rail 120 is "profiled" due to its shape. The rail 120 has been cut or formed into the outline (profile) shown best in FIG. 4 and, thus, is a profiled rail. Alternatively, the rail 120 may be cut or formed into any other suitable shape (profile). For example, the rail 120 may be formed to have a rectangular shape with grooves or ridges, such as shown in FIG. 4. Alternatively, the rail 120 may have a profiled shape that comprises a single rounded profile, or a combination of rounded curves and angular or flat portions.

The dual ram assembly 100 may be moved by following ribbed barrel cams, such as the first and second cam surfaces 170, 180 shown in FIGS. 2-3. The first and second cam surfaces 170, 180 provide a gently sloping path for the first and second cam follower sets 144, 154. The first and second cam surfaces 170, 180 have an arc of approximately 270 degrees around the turret 50. Alternatively, the first and second cam surfaces 170, 180 may have any other suitable arc.

As the cam follower sets 144, 154 follow the first and second cam surfaces 170, 180, the dual ram assembly 100 moves in a forward and backward direction. At the forward most position, the outer and inner tooling 148, 158 are inserted into or around the open end 6 of the can 5 to perform a necking operation on the can 5. The can 5, in one embodiment, does not move in an axial direction toward or away from the dual ram assembly 100 while in a pocket 24A. Rather, the can 5 remains in its pockets 24A while the outer and inner tooling 148, 158 move toward and away from the can 5. The can 5 merely remains in its pocket 24A and rotates with the turret star wheel 24 during the corresponding stage in the necking operation. The can 5 is then transfer to an adjacent transfer star wheel 22, which then passes the can 5 to a pocket 24A in a following turret star wheel 24 to be in a second (or next) stage of the necking operation. In the next stage of the necking operation on the following turret star wheel 24, the outer and inner tooling 148, 158 in a different dual ram assembly 100 performs a necking operation.

The sets of cam followers 144, 154 may have a crowned, flat, or any other suitable profile or shape. FIGS. 4-5 illustrate an example of cam followers 144, 154 with a crowned profile according to an embodiment of the invention. The cam followers 144, 154 may have the crowned/curved shape in order to prevent off center loading. It will be recognized that the profile shown in FIGS. 4-5 is exemplary only. The crowned profile of the cam followers 144, 154 may be more or less curved.

Figure 7:
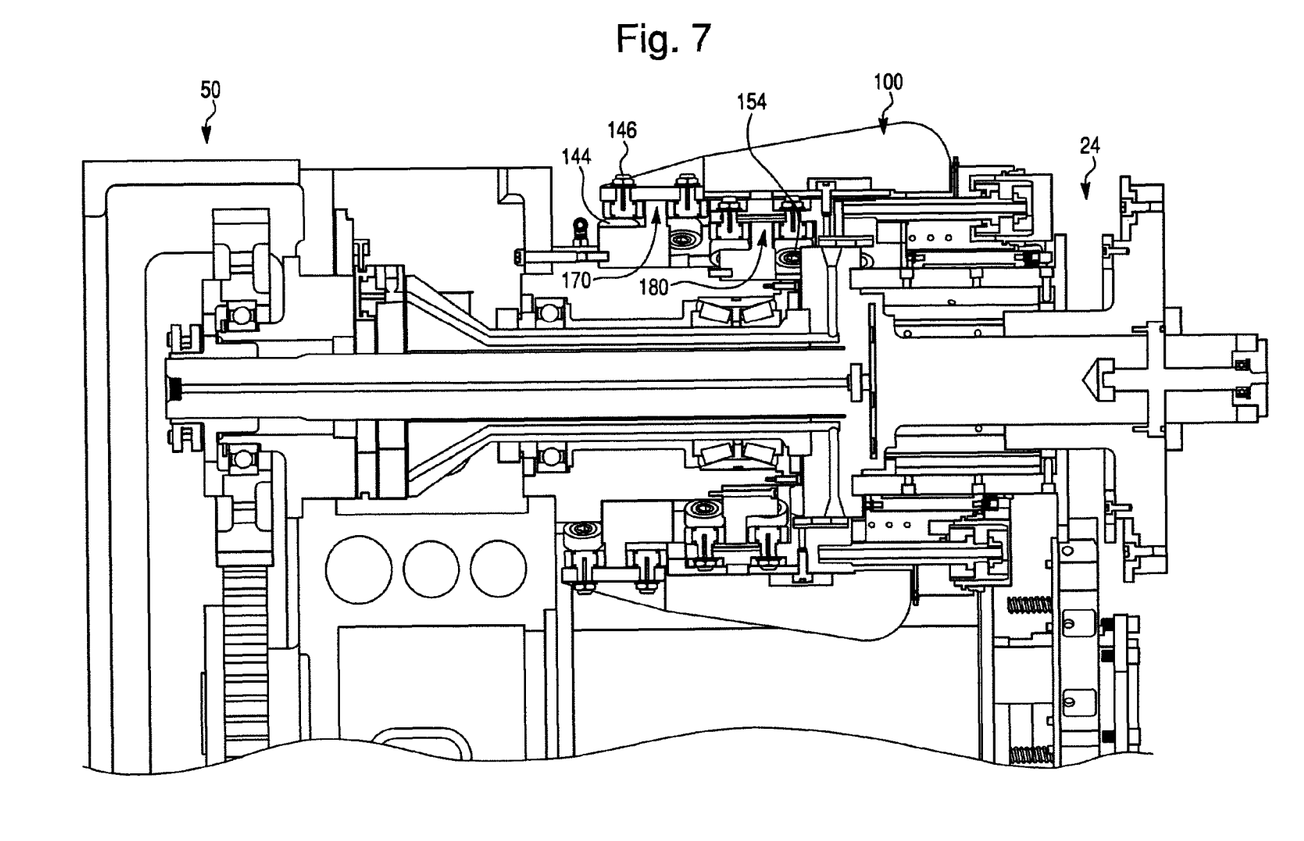
FIG. 7 is a cross-sectional view of a necker turret with dual ram assemblies taken along line 7-7 of FIG. 3.
Figure 8:
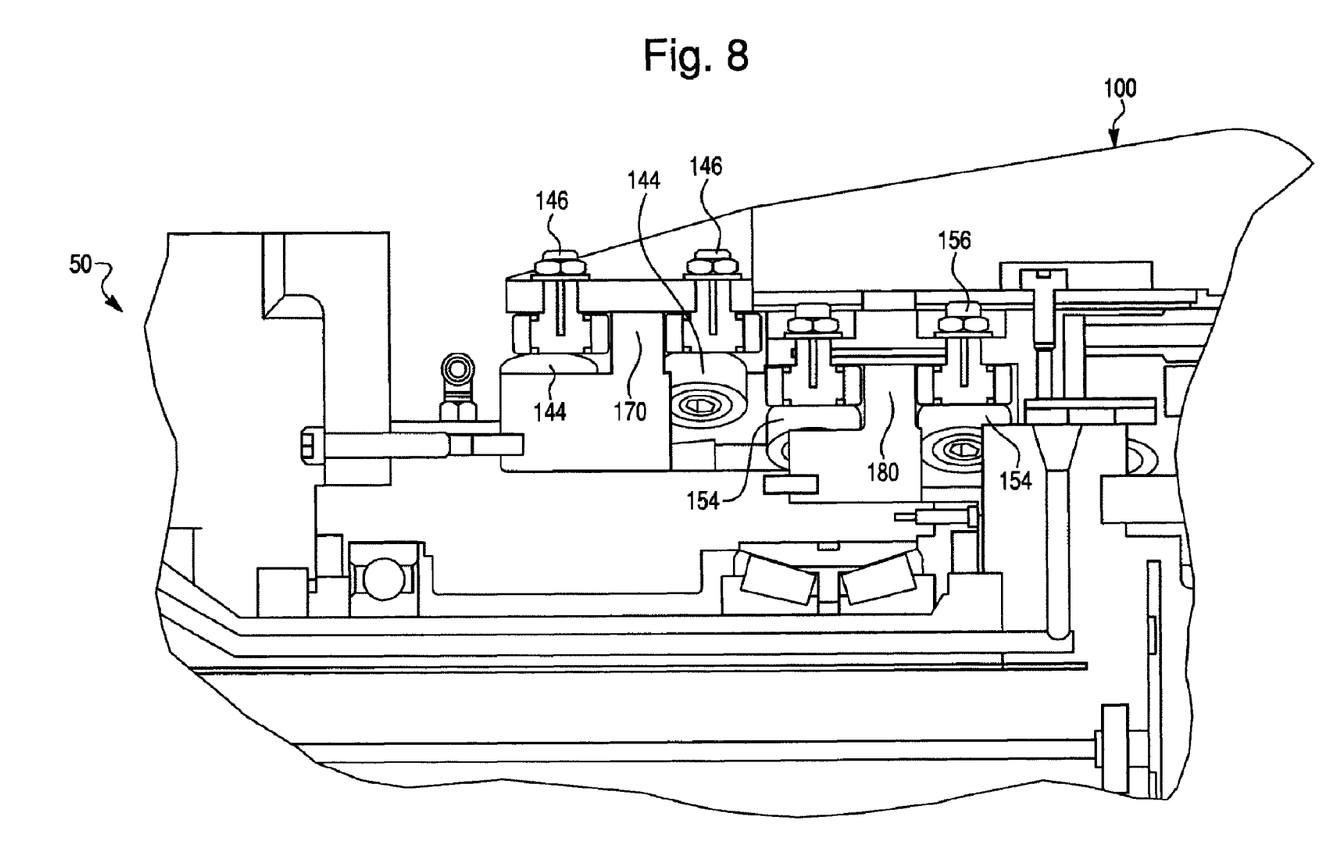
FIG. 8 is a detail cross-sectional view of the dual ram assembly of FIG. 7.

The dual ram assembly 100 is configured so that each ram does not interfere with the other ram. Thus, the first bracket 142 is positioned at a height above the second bracket 152 so that the first set of cam followers 144 is positioned higher than the second set of cam followers 154, as shown in FIG. 4. This arrangement prevents the cam followers 144, 154 from interfering with one another. Correspondingly, as shown in FIGS. 7-8, the first cam surface 170 extends upward from the turret 50 higher than the second cam surface 180. According to one embodiment, the first set of cam followers 144 is positioned about equal in height with the second bracket 152, such as shown in FIG. 5.

The tooling 105 of the dual ram assembly 100 is configured to provide a fully piloted (support) feature for the can 5 to be worked on, such as shown in FIGS. 6A-6B. The outer die tooling 148 includes a cylindrical inside surface 193 to pilot or support the can 5. The inner knockout tooling 158 includes an angled leading surface 192 and a following cylindrical surface 194, as best shown in FIGS. 6A-6B. As the outer die tooling 148 and the inner knockout tooling 158 interact with the can 5, the cylindrical inside surface 193 supports the can sidewall 8 prior to contact with an outer die profile 193A. The knockout tooling 158 enters into the open end 6 of the can 5 to provide support to the can 5 during the necking operation. The cylindrical inside surface 193 supports the can 5 by contacting the sidewall 8 of the can 5 prior to the can 5 contacting the outer die profile 193A.

According to an aspect of the invention, a method for utilizing a dual ram assembly 100 in a necking machine line 10 includes providing a first necking station in a corresponding pocket 24A on a first necking machine 50 with a first dual ram assembly 100 including first and second rams 140, 150 attached to one another. The second ram 150 with the inner knockout tooling 158 is moved toward a can in the first necking station. The first ram 140 with the outer die tooling 148 is moved simultaneously towards the can. The tooling 148, 158 then performs a first stage of a necking operation on the can 5. Next, the outer die tooling 148 and inner knockout tooling 158 are withdrawn from the can 5. The can 5 is stationary in an axial direction relative to the outer and inner tooling 148, 158. The outer and inner tooling 148, 158 move towards and away from the can 5 in an axial direction of the can 5 so that the can 5 remains stationary in an axial direction relative to the outer and inner tooling 148, 158.

The can 5 is then transferred from the first necking machine 50 to a transfer star wheel 22. Next, the can is transferred from the transfer star wheel 22 to a second necking station (in a corresponding pocket 24A) in an adjacent turret star wheel 24 on a second turret 50 with a second dual ram assembly 100.

According to another embodiment, as shown in FIGS. 9A-11, the dual ram assembly 100 includes an anti-lift device 160. The anti-lift device 160 is attached to the turret 50 (see FIGS. 10 and 11). The anti-lift device 160 is configured to provide an external guidance feature for the dual ram assembly 100. The anti-lift device 160 provides external guidance and acts as a counterforce to prevent lifting of the cam followers 144, 154 off of the cam surfaces 170, 180.

Figure 9A:
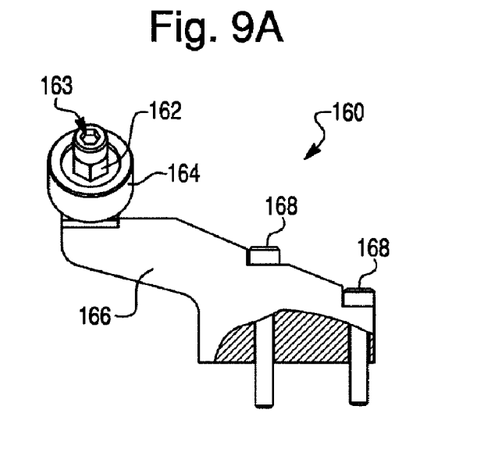
FIG. 9A is a side view of an anti-lift device for a dual ram assembly according to another embodiment.
Figure 9B:
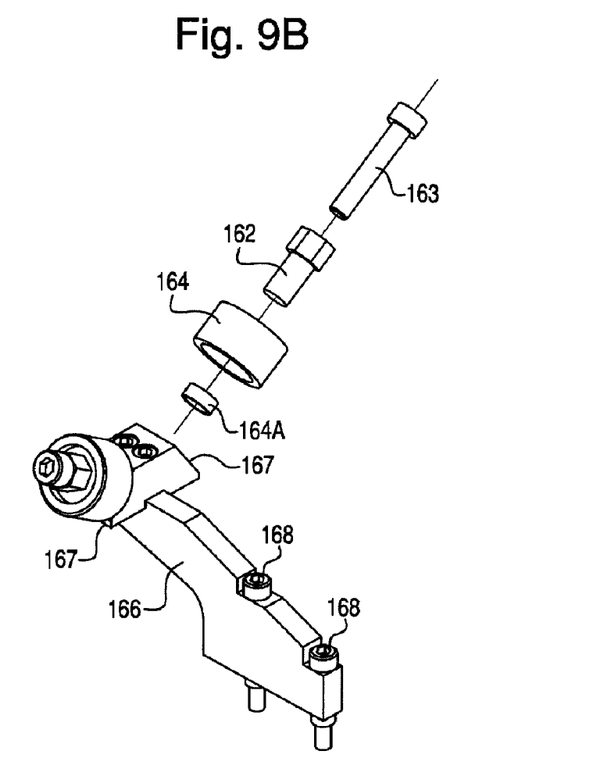
FIG. 9B is an exploded perspective view of the anti-lift device of FIG. 9A.

The anti-lift device 160 includes an anti-lift bracket 166 that is fixed to the turret 50 by fasteners 168. The fasteners 168 fix the anti-lift bracket 166 to an immobile portion of the turret 50. Two rollers 164 are attached to respective angled surfaces 167 of the bracket, as can be seen in FIG. 9B. Each roller 164 is attached to the respective angled surface 167 by an eccentric bushing 162, as best shown in FIGS. 9A-9B. Each roller 164 is attached by a nut 164A, an eccentric bushing 162, and a fastener (bolt) 163.

Each roller 164 in the anti-lift device 160 is pressed against a bracket 142 of a different adjacent dual ram assembly 100. As the dual ram assemblies 100 move along the first and second cam surfaces 170, 180, the anti-lift device 160 assists in keeping the first and second cam follower sets 144, 154 against their respective cam surfaces 170, 180.

Figure 10:
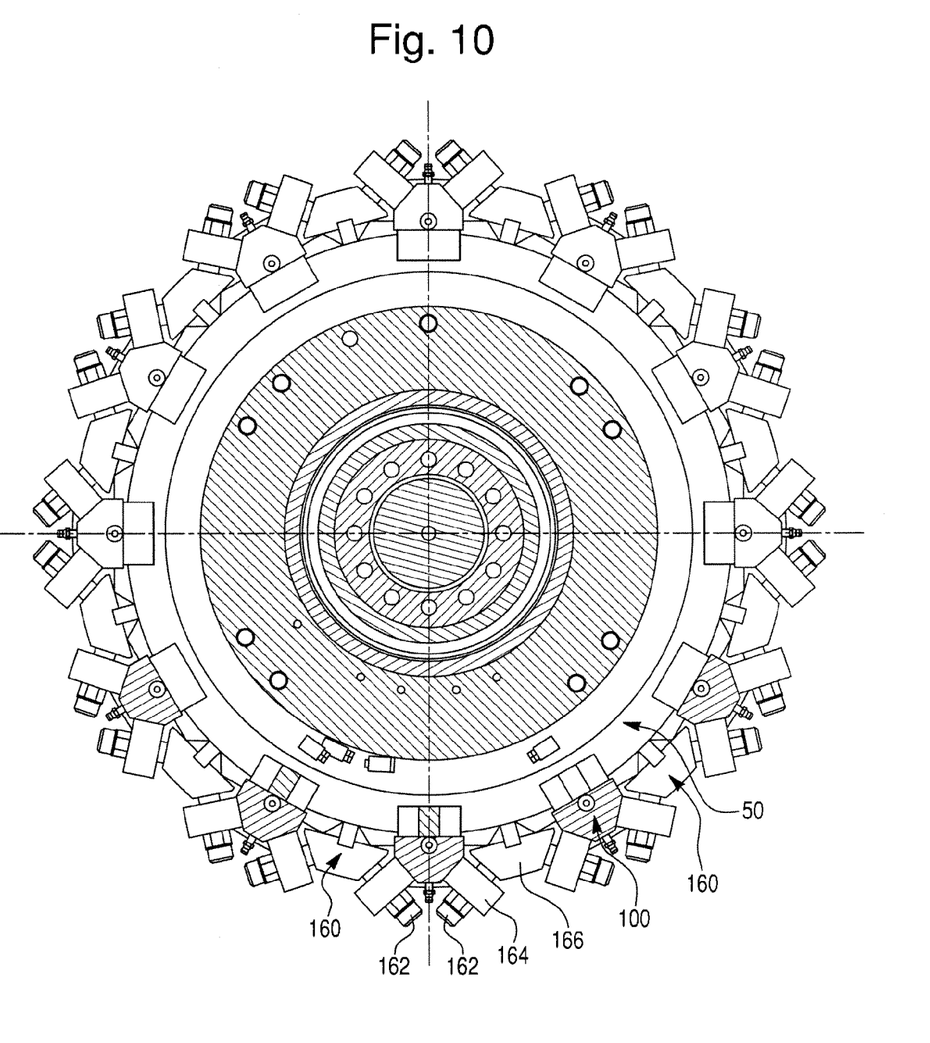
FIG. 10 is a cross-sectional view of a turret machine utilizing the anti-lift device of FIG. 9A.
Figure 11:
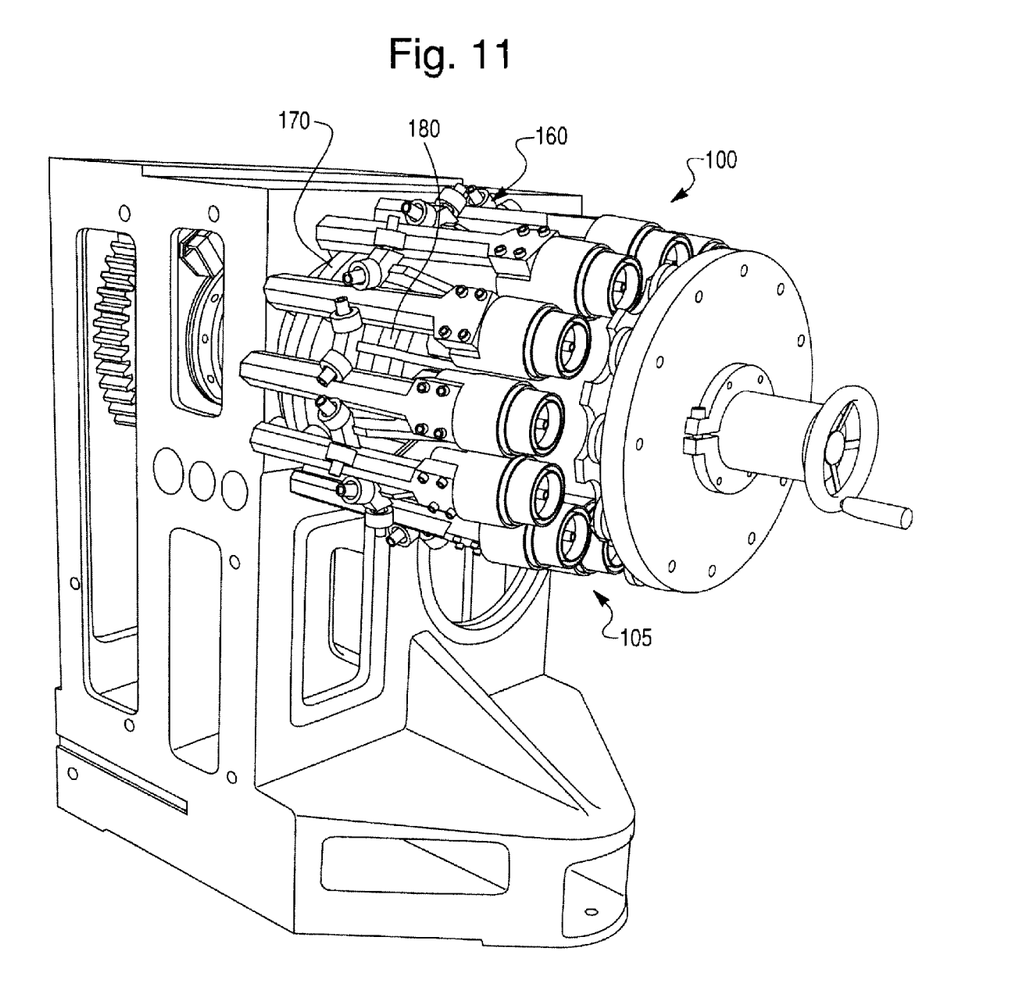
FIG. 11 is a perspective view of a necker module with the turret machine of FIG. 10.

As can be best seen in FIG. 10, each dual ram assembly 100 is contacted (pressed on) by a roller 164 from two different anti-lift devices 160. In other words, an anti-lift device 160 is positioned between every dual ram assembly 100 on a turret 50 so that one anti-lift device 160 contacts two different dual ram assemblies 100, and each dual ram assembly 100 is contacted by two different anti-lift devices 160.

It is important to note that the construction and arrangement of the dual ram assembly as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Furthermore, it will be recognized that the terms attached, connected or fixed can mean either removably or permanently attached, connected or fixed. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. A ram assembly for a turret machine with a turret axis, comprising:
    a frame member;
    a first ram with a first cam follower bracket and a first set of cam followers;
    an outer die tooling connected to the first ram;
    a second ram with a second cam follower bracket and second set of cam followers;
    an inner knockout tooling connected to the second ram;
    a first cam surface, the first set of cam followers configured to follow the first cam surface;
    a second cam surface, the second set of cam followers configured to follow the second cam surface; and
    an anti-lift device configured in relation to the turret machine to resist lifting of the ram assembly away from the turret axis in a radial direction, thereby resisting a sliding of the first and second set of cam followers laterally along the first and second cam surfaces away from the turret axis,
    wherein the first ram is connected to the second ram on the frame member,
    wherein as the first set of cam followers follows the first cam surface, the outer die tooling moves toward or away from an article to be worked on, and wherein as the second set of cam followers follows the second cam surface, the inner knockout tooling moves toward or away from the article to be worked on, and
    wherein the anti-lift device includes a first anti-lift roller positioned against the first cam follower bracket.

2. The ram assembly of claim 1, wherein the first set of cam followers is positioned at a height above the second set of cam followers.

3. The ram assembly of claim 1, wherein the anti-lift device further includes an eccentric bushing in the first anti-lift roller.

4. The ram assembly of claim 1, wherein the anti-lift device further includes a second anti-lift roller, the second anti-lift roller being positioned against a different adjacent first cam follower bracket of a different ram assembly than that of the first anti-lift roller.

5. The ram assembly of claim 1, wherein the outer die tooling includes a cylindrical inside surface and an outer die profile, and wherein the inner knockout tooling includes an angled leading surface and a following cylindrical surface.

6. The ram assembly of claim 5, wherein the cylindrical inside surface and the angled leading surface are configured such that the cylindrical inside surface contacts a sidewall of the article to be worked on prior to the outer die profile contacting the article to be worked on.

7. The ram assembly of claim 6, wherein the outer die tooling performs a necking operation on the article to be worked on.

8. The ram assembly of claim 1, further comprising a slide block attached to the frame member and a profiled rail, wherein the slide block is attached to and configured to slide along the profiled rail.

9. A necking module, comprising:
    a necking machine including a necking machine axis;
    a first cam surface on a shaft of the necking machine;
    a second cam surface on the shaft; and
    a dual ram assembly including an inner knockout tooling and an outer die tooling configured to perform a necking operation on an article to be worked on, wherein the dual ram assembly comprises:
        a frame member;
        a first ram with a first cam follower bracket and a first set of cam followers, the outer die tooling being connected to the first ram, and the first set of cam followers being configured to follow the first cam surface;
        a second ram with a second cam follower bracket and second set of cam followers, the inner knockout tooling being connected to the second ram, and the second set of cam followers being configured to follow the second cam surface; and
    an anti-lift device configured in relation to the necking machine to resist lifting of the dual ram assembly away from the necking machine axis in a radial direction, thereby resisting a sliding of the first and second set of cam followers laterally along the first and second cam surfaces away from the necking machine axis,
    wherein the first ram is connected to the second ram on the frame member,
    wherein as the first set of cam followers follows the first cam surface, the outer die tooling moves toward or away from an article to be worked on, and wherein as the second set of cam followers follows the second cam surface, the inner knockout tooling moves toward or away from the article to be worked on, and
    wherein the anti-lift device includes a first anti-lift roller positioned against the first cam follower bracket.

10. The necking module of claim 9, wherein the first set of cam followers is positioned at a height above the second set of cam followers.

11. The necking module of claim 9, wherein the first and/or second cam surface has approximately a 270 degree arc.

12. The necking module of claim 9, wherein the anti-lift device further includes an eccentric bushing in the first anti-lift roller.

13. The necking module of claim 9, wherein the anti-lift device further includes a second anti-lift roller, the second anti-lift roller being positioned against a different adjacent first cam follower bracket of a different dual ram assembly than that of the first anti-lift roller.

14. The necking module of claim 9, wherein the outer die tooling includes a cylindrical inside surface and an outer die profile, and wherein the inner knockout tooling includes an angled leading surface and a following cylindrical surface.

15. The necking module of claim 14, wherein the cylindrical inside surface and the angled leading surface are configured such that the cylindrical inside surface contacts a sidewall of the article to be worked on prior to the outer die profile contacting the article to be worked on.

16. The necking module of claim 15, wherein the outer die tooling performs a necking operation on the article to be worked on.

17. The necking module of claim 9, further comprising a slide block attached to the frame member and a profiled rail, wherein the slide block is attached to and configured to slide along the profiled rail.

18. The necking module of claim 17, wherein the profiled rail is fixed to the necking machine.

19. A method for utilizing a dual ram assembly in a necking machine line, comprising the steps of:
   providing a first necking station on a first necking machine with a necking machine axis and a first dual ram assembly including first and second rams attached to one another, wherein the first ram includes a first cam follower bracket and a first set of cam followers configured to follow a first cam surface and the second ram includes a second set of cam followers configured to follow a second cam surface;
   moving the second ram with inner knockout tooling towards an article to be worked on in the first necking station;
   moving the first ram with outer die tooling towards the article to be worked on;
   performing a necking operation on the article to be worked on;
   withdrawing the outer die tooling and inner knockout tooling from the article to be worked on; and
   resisting lifting of the first dual ram assembly away from the necking machine axis in a radial direction with an anti-lift device, thereby resisting a sliding of the first and second set of cam followers laterally along the first and second cam surfaces away from the necking machine axis,
   wherein the anti-lift device includes a first anti-lift roller positioned against the first cam follower bracket.

20. The method of claim 19, wherein the article to be worked on is stationary in an axial direction relative to the inner and outer tooling.

21. The method of claim 20, wherein the inner and outer tooling moves toward and away from the article to be worked on in an axial direction of the article so that the article remains stationary in an axial direction relative to the inner and outer tooling.

22. The method of claim 19, further comprising:
   transferring the article to be worked on from the first necking machine to a transfer star wheel.

23. The method of claim 22, further comprising:
   transferring the article to be worked on from the transfer star wheel to a second necking station with a second dual ram assembly on a second necking machine.

* * * * *